United States Patent
Nabeiro et al.

(10) Patent No.: US 11,767,211 B2
(45) Date of Patent: Sep. 26, 2023

(54) BEVERAGE DISTRIBUTION SYSTEM WITH ENHANCED PURGE AND RESIDUE DISCHARGE, AND PROCESS OF OPERATION OF SAID SYSTEM

(71) Applicant: NOVADELTA—COMÉRCIO E INDÚSTRIA DE CAFÉS S.A., Lisbon (PT)

(72) Inventors: Rui Miguel Nabeiro, Campo Maior (PT); Jesús Medina Mundt, Lisbon (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 268 days.

(21) Appl. No.: 17/264,573

(22) PCT Filed: Jul. 30, 2019

(86) PCT No.: PCT/PT2019/050024
§ 371 (c)(1),
(2) Date: Jan. 29, 2021

(87) PCT Pub. No.: WO2020/027678
PCT Pub. Date: Feb. 6, 2020

(65) Prior Publication Data
US 2021/0316980 A1 Oct. 14, 2021

(30) Foreign Application Priority Data
Aug. 1, 2018 (PT) .......................... 110899

(51) Int. Cl.
*B67D 1/07* (2006.01)
*A47G 19/22* (2006.01)
(Continued)

(52) U.S. Cl.
CPC ............ *B67D 1/07* (2013.01); *A47G 19/2205* (2013.01); *A47J 31/60* (2013.01); *B67D 1/06* (2013.01);
(Continued)

(58) Field of Classification Search
CPC ....... B67D 1/06; B67D 1/07; B67D 2001/075; B67D 2001/0094
(Continued)

(56) References Cited

U.S. PATENT DOCUMENTS 4,877,065 A * 10/1989 Lamboy ................... B65B 3/16
141/319
6,915,924 B1 * 7/2005 Noiseux .................. E03B 11/02
222/64
(Continued)

FOREIGN PATENT DOCUMENTS

EP 1 991 094 B1 11/2008
EP 2 285 687 B1 2/2011
(Continued)

OTHER PUBLICATIONS

International Search Report for PCT/PT2019/050024 dated Nov. 15, 2019 [PCT/ISA/210].
Written Opinion for PCT/PT2019/050024 dated Nov. 15, 2019 [PCT/ISA/237].

*Primary Examiner* — Timothy L Maust
(74) *Attorney, Agent, or Firm* — Sughrue Mion, PLLC (57) ABSTRACT

The present invention discloses a beverage distribution system, in particular a system for preparing espresso coffee and similar aromatic beverages, comprising a drinking recipient (1, 1'), for example of the glass, cup or similar type, a beverage discharge disposition (2) operatively associated to a beverage pressurization device (3), whereby said beverage discharge disposition (2) is provided so that the beverage discharge flow impinges, with a given flow pres-
(Continued)

sure, to a flow regulation disposition (12) in the base region (11) of said drinking recipient (1, 1') along a direction opposite the gravity force, whereby said beverage apparatus (3) further comprises purge means (26) adapted so that provide the circulation of a purge flow through at least part of said beverage discharge disposition (2), optionally also through a drinking recipient (1, 1') operatively engaged thereon.

20 Claims, 6 Drawing Sheets

(51) Int. Cl.
    *A47J 31/60*     (2006.01)
    *B67D 1/06*     (2006.01)
    *B67D 1/00*     (2006.01)

(52) U.S. Cl.
    CPC ............ *B67D 2001/0094* (2013.01); *B67D 2210/00047* (2013.01); *B67D 2210/00065* (2013.01)

(58) Field of Classification Search
    USPC .......................................... 141/113
    See application file for complete search history.

(56) References Cited

U.S. PATENT DOCUMENTS

| | | | | |
|---|---|---|---|---|
| 7,455,082 B2* | 11/2008 | Monzel | ............... | B08B 9/0813 |
| | | | | 141/2 |
| 8,448,677 B2* | 5/2013 | Ficai | ................. | B65D 1/06 |
| | | | | 141/105 |
| 8,777,182 B2* | 7/2014 | Springer | ............ | A47G 19/2205 |
| | | | | 137/499 |
| 8,899,281 B2* | 12/2014 | Russell | ................. | B67D 1/04 |
| | | | | 141/113 |
| 9,694,931 B2* | 7/2017 | Springer | ............... | F16K 31/084 |
| 10,611,619 B2* | 4/2020 | Bolender | ............... | B67D 1/06 |
| 2008/0223478 A1* | 9/2008 | Hantsoo | ............... | B67D 1/0894 |
| | | | | 141/2 |
| 2012/0103926 A1* | 5/2012 | Ibsies | ................. | B65D 1/06 |
| | | | | 141/113 |

FOREIGN PATENT DOCUMENTS

| | | | |
|---|---|---|---|
| EP | 2 120 652 B1 | 12/2011 | |
| EP | 2 928 347 B1 | 10/2015 | |
| WO | 2009/143164 A1 | 11/2009 | |
| WO | WO-2020027676 A1 * | 2/2020 | ......... A47G 19/2205 |

\* cited by examiner

BEVERAGE DISTRIBUTION SYSTEM WITH ENHANCED PURGE AND RESIDUE DISCHARGE, AND PROCESS OF OPERATION OF SAID SYSTEM

CROSS REFERENCE TO RELATED APPLICATIONS

This application is a National Stage of International Application No. PCT/PT2019/050024 filed Jul. 30, 2019, claiming priority based on Portugal Patent Application No. 110899 filed Aug. 1, 2018.

FIELD OF THE INVENTION

The present invention refers to the field of beverage distribution systems, in particular systems for preparation of beverages based upon single portions of precursor edible substances, such as for example espresso coffee and similar, presenting beverage discharge means to the interior of a drinking recipient along a direction substantially opposite to the gravity force.

BACKGROUND OF THE INVENTION

It is known to provide a beverage discharge along a direction contrary to the gravity force, and through the wall of a drinking recipient.

In particular, in the case of aromatic beverages, such as for example espresso type coffee, this beverage discharge is a relevant process with potential impact upon the beverage quality obtained in the drinking recipient. Amongst several aspects, it is important to ensure that any eventual liquid residues from the beverage discharge do not lead to a degradation of the beverage quality. In this particular, the prior art includes solutions relating to drainage of residues and purge flows of beverage discharge dispositions Document EP 1991094 B1 discloses a drinking recipient adapted so that can be filled from the base and presenting a sealable base wall for such purpose, whereby the beverage is injected with enough pressure to open a valve provided as flow regulation element of beverage discharge flow.

Document EP 2285687 B1 discloses a system that presents beverage discharge through a base region of a glass. The system includes discharge means designed so as to evacuate liquid resides from the beverage discharge means. In particular, the system presents a surface opening for placement of recipients that is configured in form of bowl, whereby said opening is adapted so as to discharge eventual rests of discharged beverage that accumulate on said recipient placement surface.

Moreover, the system presents a purge device. Said purge device includes a purge line connected to a water source and adapted so as to purge the injector of beverage discharge. The purge line includes a valve that can be operated in manual or automatic manner. Moreover, a discharge valve can be used together with the purge valve so as to discharge the purge fluid from the beverage discharge region. The actuation of the purge valve can provide conduction of the purge fluid through the discharge injector, and the actuation of the draining valve can provide an alternative path for the purge liquid, without passing through the discharge injector. In an embodiment, a recipient is placed on a discharge disposition, a valve is open so that fluid flows between a conduct and said recipient; a valve is closed so as to stop the flow, the recipient is removed, a second valve is opened to the purge line, the purge of the discharge disposition is done and the second valve is closed.

Document EP 2120652 B1 discloses a system of the type of the present invention, whereby the base region of said drinking recipient can be retained by means of a thread on a placement disposition configured as brewing device so that can collect a capsule containing an edible substance that is precursor of beverage, downstream of the fluid discharge and upstream of the base portion of drinking recipient. Moreover, the base region of said placement disposition presents three transversal projections developing inwards and that, in correspondence to three transversal projections associated with the fluid discharge disposition and developing outwards, provide the placement and retention of placement disposition on the fluid discharge disposition by means of rotation of said placement disposition around a respective central axis, thereby providing connection in fluid communication of upstream fluid discharge with the drinking recipient downstream.

Document EP 2928347 B1 discloses a system of the type of the present invention that discloses discharge means designed to evacuate liquid residues from beverage discharge means. In particular, said discharge means are provided as a junction element that connects an edge portion of a descending flexible tube from the exit side of a brewing device, and an ascending beverage discharge tube along the vertical, with a discharge tube that develops towards an independent exit. The junction element is provided so that can be actuated, between a non-operative position and an operative position.

There is therefore the need for a simple and efficient solution of purge flow, adapted to the type of beverage discharge that is particular along a direction contrary to the gravity force.

GENERAL DESCRIPTION OF THE INVENTION

The objective of the present invention is to provide a beverage distribution system presenting a beverage discharge disposition that provides the pressurized injection of beverage discharge flow into the interior of a drinking recipient along a direction opposite the direction of the gravity force, through a base region of said drinking recipient, the system being adapted so that provides an effective purge of the beverage discharge means and associated brewing device, by simple and reliable construction and operation means.

This objective is solved according to the present invention by means of a beverage preparation system according to claim 1, whereby preferred embodiments are described in the secondary claims.

In particular, the objective above is solved by means of a system whereby the beverage apparatus comprises two flow circulation lines developing from the pressurization device, including a first line that develops through the brewing device and the beverage discharge connection until the beverage discharge element, and a second line that develops through a single-way valve and until the region in the proximity upstream of said beverage discharge element, in flow connection, so that can provide circulation of purge flow through said first flow circulation line, along a circulation direction opposite to the beverage discharge direction (BD), and until the brewing device, being collected by collection means disposed underneath.

The beverage apparatus can further comprise a control device adapted so that can control the flow circulation at each time through only one of said two flow circulation. In particular, said control device can control the circulation of a purge flow, instead of a beverage preparation flow, by means of actuation of an electro-valve device associated with said second flow circulation line.

Moreover, said second flow circulation line can further include a device of single-way valve type, preferentially disposed in the proximity of the connection to said first flow circulation line, and adapted so that can prevent the beverage discharge flow to circulate through said second flow circulation line.

It is preferred when said first and second flow circulation lines develop, at least in respective regions of proximity upstream of the beverage discharge element, along a similar direction, in particular along a non-horizontal direction.

Another objective of the present invention is to provide a process of preparation of beverages including the use of a drinking recipient and of a beverage discharge disposition, whereby the beverage discharge flow through a base region of said recipient, so that there is provided an effective purge of the beverage discharge means and associated brewing device, in reliable and ergonomic manner to the user.

This objective is solved according to the present invention by means of a process of preparation of beverages according to claim 14, whereby preferred embodiments are described in the secondary claims.

DESCRIPTION OF THE FIGURES

The invention shall hereinafter be explained in greater detail based upon preferred embodiments and on the attached Figures.

The Figures show, in simplified schematic representations.

DETAILED DESCRIPTION OF PREFERRED EMBODIMENTS OF THE INVENTION

Figure 1:
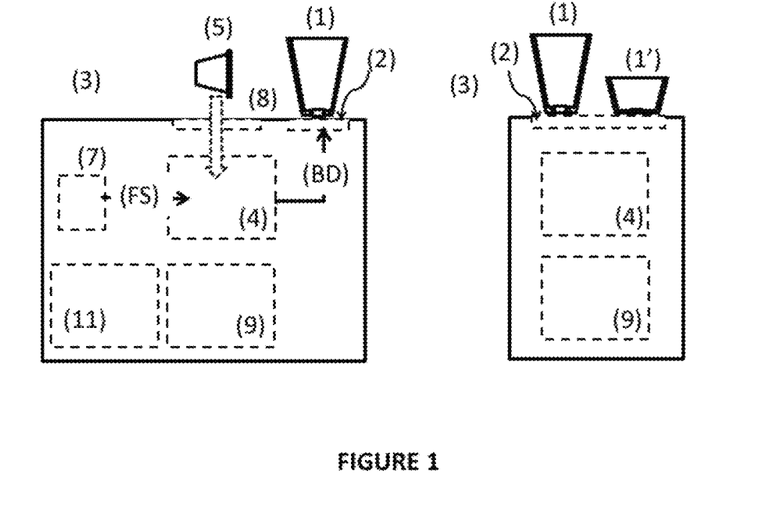
FIG. 1: side and front views of main components of a system of edible products of the type of the present invention.
Figure 2:
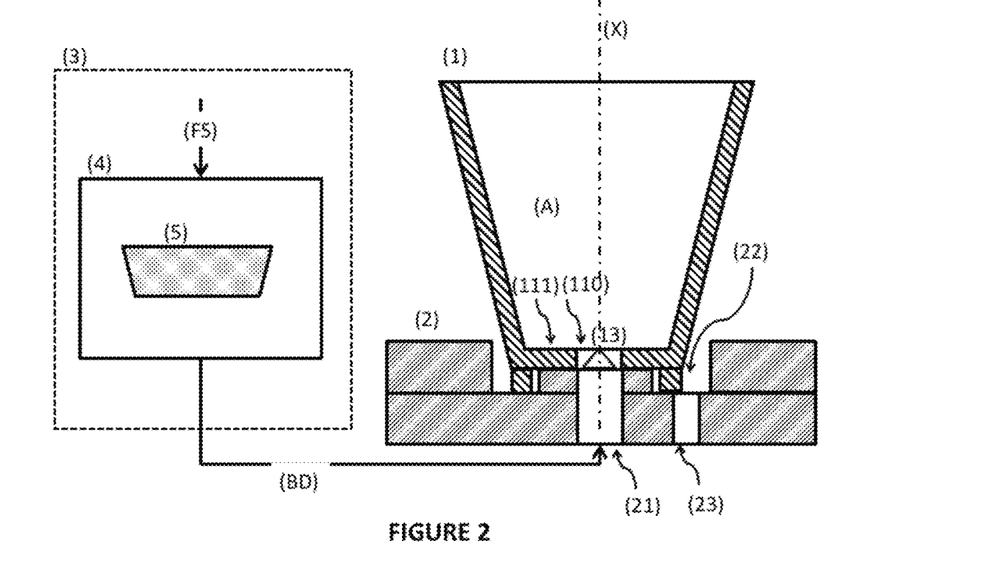
FIG. 2: diagram of a drinking recipient (1) operatively placed on the beverage discharge disposition (2) of a beverage apparatus (3) according to the prior art.

FIGS. 1 and 2 represent the main operative components of a preferred embodiment of a system for distribution of edible products of the type of the present invention.

Said system comprises at least one type of drinking recipient (1, 1'), such as for example a cup or a glass, adapted so that can be operatively retained on a beverage discharge disposition (2) of a beverage apparatus (3).

Said drinking recipients (1, 1') present a collection space (A) confined by a base wall (11) and a lateral wall (12), and further present flow regulation means (13) provided as at least one of:
- a device actuated by pressure, for example a single-way valve, preferentially retained by means of pressure-fitting on an edge of a flow passageway (110);
- a micro-holes disposition provided upstream, preferentially in the vicinity, of the region of entry of beverage flow in the region of the base wall (11) of said collection space (A).

the system can further include a plurality of types of drinking recipients (1, 1') presenting different dimensions, in particular different dimensions, for example diameter, of respective base walls (11), but adapted so as to engage on a same type of beverage discharge disposition (2), whereby at least one of said types of drinking recipients (1, 1') is not a disposable recipient.

Said beverage apparatus (3), for example in the form of machine for preparation of espresso coffee and similar aromatic beverages, presents at least one brewing device (4) provided so that can collect one portion (5) of edible substance that is precursor of beverage, for example contained in a capsule or similar.

Moreover, the beverage apparatus (3) can include a fluid reservoir (not represented), and includes a flow pressurization device (7) and a fluid heating device (6) (not represented in these Figures), so that can supply a flow (FS) at a temperature comprised between 60 and 100° C. and at a pressure comprised between 1 and 20 bar, preferentially more than 10 bar, so as to interact with said edible substance.

Said discharge flow (BD) is then conducted from an exit of said brewing device (4) to a beverage discharge disposition (2) arranged downstream thereof and that includes at least one beverage discharge element (21) adapted so that can retain a drinking recipient (1, 1'), preferentially by means of mechanical engagement with the base region (11) thereof.

As represented in FIG. 2, said types of drinking recipient (1, 1') can present a flow regulation disposition (12), for example of the type single-way valve (symbolically represented by a triangle), provided retained on a passageway opening (110) of said base wall (11) and adapted so that only provides passageway to a pressurized flow of beverage discharge (BD), downstream, to said collection space (A), along a direction opposite to the gravity force, if impinged with a flow pressure bigger than a previously defined value of flow pressure.

Said beverage preparation apparatus (3) can further comprise:
- a flow pressurization device (7), for example a pump, adapted so that can supply a fluid flow (FS) at a pressure comprised between 1 and 20 bar, preferentially at least 10 bar,
- a flow heating device (6), for example of the thermoblock type, adapted so that can heat the fluid flow (FS) up to a temperature of at least 60° C., preferentially at least 80° C.

Said apparatus (3) can further comprise motorized actuation means (10) of said beverage preparation device (4) provided in data connection with a control device, and adapted so that can move parts of beverage preparation device (4) between an open position where they can collect a portion (5) of edible substance, and a closed position where pressurized flow can be injected, and vice-versa.

Figure 3:
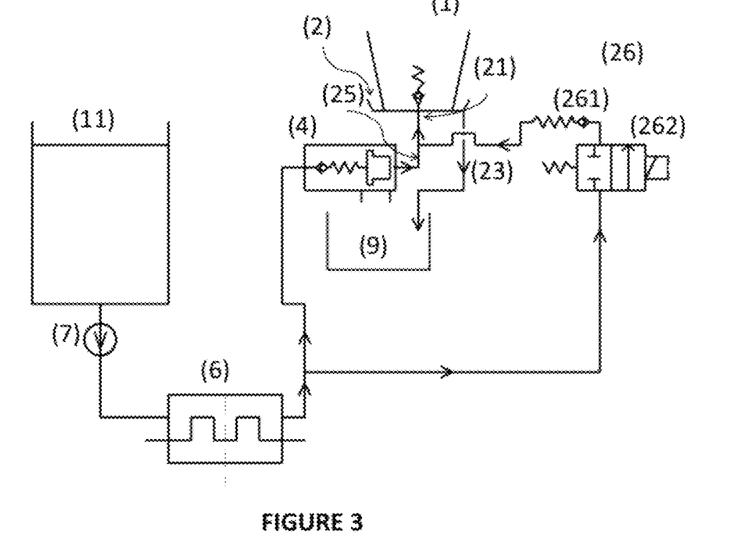
FIG. 3: diagram of fluid circulation of a system according to the present invention.

FIG. 3 represents a flow circulation diagram of a beverage apparatus (3) in a system according to the invention.

Said beverage apparatus (3) preferentially comprises a fluid source (11), for example a fluid reservoir or a connection to a fluid supply network, provided in flow connection with a flow pressurization device (7), for example of the pump type, and, preferentially, a flow heating device (6), for example of thermoblock type, downstream thereof.

The beverage apparatus (3) further comprises two fluid lines that develop downstream from said flow pressurization device (7).

The beverage apparatus (3) further comprises a beverage preparation device (4) adapted so that can be actuated between an open position, where can collect a single portion (5) of edible substance, and a closed position, where a can inject a pressurized fluid and supply a beverage discharge flow (BD) of the resulting beverage to a beverage discharge disposition (2).

The beverage apparatus (3) comprises a first flow circulation line that connects the flow pressurization device (7) to said beverage preparation device (4) and that connects the latter to a beverage discharge disposition (2), in particular through a beverage discharge connection (25), so that provides injection of beverage discharge through a beverage discharge element (21) to the interior of a drinking recipient (1) operatively retained on a beverage discharge disposition (2).

According to an inventive aspect, said beverage apparatus (3) further comprises purge means (26) adapted so that provide circulation of a purge flow through said beverage discharge disposition (2), and disposed in flow connection, through a second flow circulation line, downstream of said flow pressurization device (7).

Said second flow circulation line develops in bifurcated manner with said first circulation line, from a location downstream of said flow pressurization device (7) and upstream of said brewing device (4). Moreover, said second circulation line provides flow connection with a valve-type single-way device (261) and an electro-valve type device (262), and further with said first flow circulation line, preferentially in a region in the proximity upstream of said beverage discharge element (21).

It is herewith provided the circulation of a purge flow through said second flow circulation line and said first flow circulation line, in a direction opposite the one of the beverage discharge, until the brewing device (4).

The beverage apparatus (3) further comprises a control device (not represented) adapted so that only actuates said electro-valve type device (262), so that the flow circulation is done through said flow circulation line, if said brewing device (4) is closed and is no portion (5) of edible substance is inside thereof.

The purge flow is herewith made circulate through a single-way valve type device (261) and downstream thereof.

It is preferred when the purge flow circulates through the beverage discharge connection (25), in a direction opposite to the one of the beverage discharge, until the brewing device (4) where the flow falls to residue collection means (9) disposed underneath thereof.

Moreover, it is preferred when the purge flow also circulates through said beverage discharge element (21), in a direction opposite to the one of the gravity force.

It is preferred when the hydraulic charge on said second flow circulation line is smaller than the hydraulic charge on said first flow circulation line, and adapted so that the purge flow circulates with a hydraulic pressure smaller than that of the beverage discharge flow.

In particular, it is preferred when the purge flow circulates with an hydraulic pressure adapted so that can circulate through the beverage discharge element (21), but without projecting above thereof, so that the flow can be collected by liquid resides collection means (23) associated with said beverage discharge disposition (2) and adapted so that provide flow connection with said residues collection means (9).

It is further preferred when said control device is adapted so that provides the user with an indication relating to the need of a purge cycle after a previously determined number of beverage preparation cycles.

It is further preferred when said control device is adapted so that provides the realization of the purge cycle without requiring any actuation by a user for such purpose.

It is further preferred when said control device is adapted so that provides the user with an indication relating to at least one of: purge cycle to be initiated, on-going and concluded, whereby this indication is preferentially presented by information display means associated with said beverage discharge (2).

Figure 4:
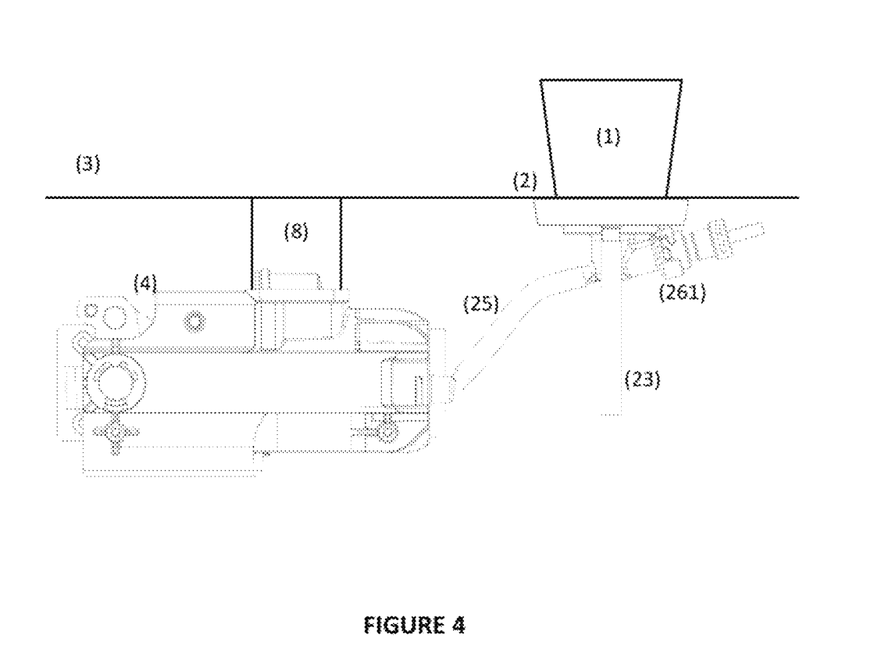
FIG. 4: side view of an embodiment of a system according to the present invention.
Figure 5:
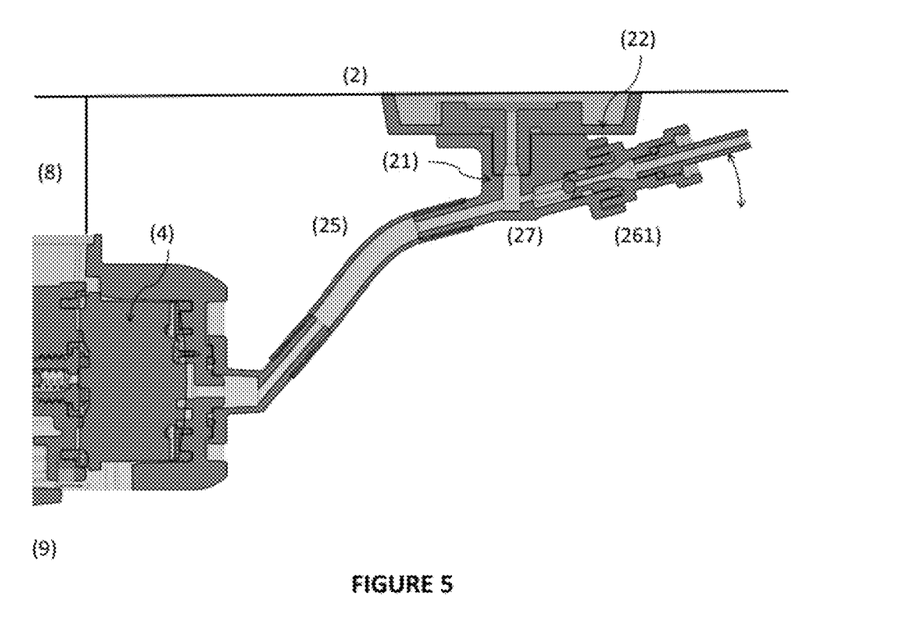
FIG. 5: side cut view of part of the operative components of embodiment of beverage apparatus (3) represented in FIG. 4.
Figure 6:
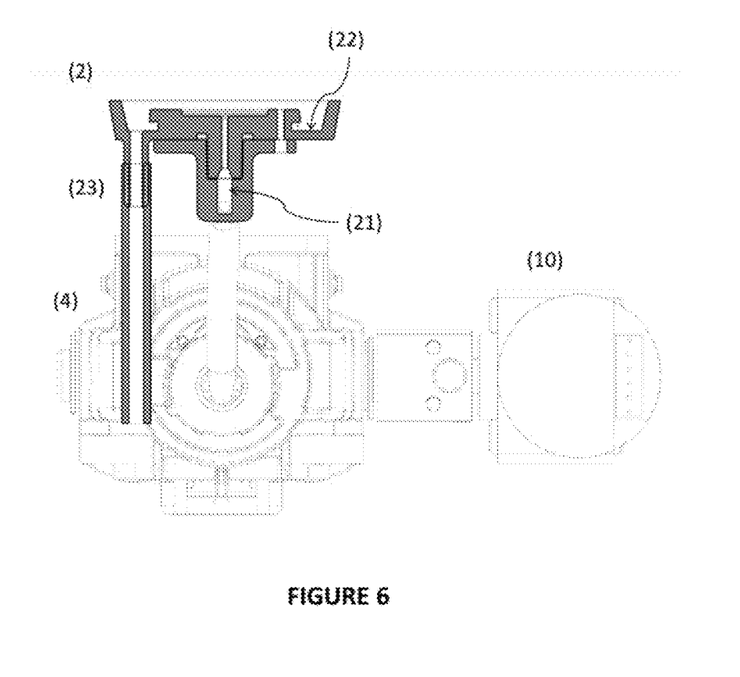
FIG. 6: frontal cut view of part of the operative components of embodiment of beverage apparatus (3) represented in FIG. 4.

FIGS. 4 to 6 represent different views of a preferred embodiment of relative disposition of purge means (26) in a system according to the invention.

As represented, it is preferred when said purge means (26) are provided in flow connection with an edge of said beverage discharge connection (25), so that can make circulate pressurized flow of purge fluid by said flow pressurization device (7), and through the interior of the beverage preparation device (4) and so that said purge fluid flows, assisted by the gravity force, through a discharge opening thereof adapted for discharge of said individual portion (5), into the inside of residues collection means (9) provided underneath said beverage preparation device (4).

It is preferred when said purge means (26) include at least one of:
  a single-way device (261), for example of the type single-way valve, e
  an electro-valve (262) associated with said single-way device (261).

It is further preferred when said single-way device (261) is provided in flow connection upstream, preferentially in the proximity of, said beverage discharge element (21) and said beverage discharge connection (25), and when said electro-valve device (262) is provided in flow connection upstream, preferentially in the proximity, of said single-way device (261).

Figure 7:
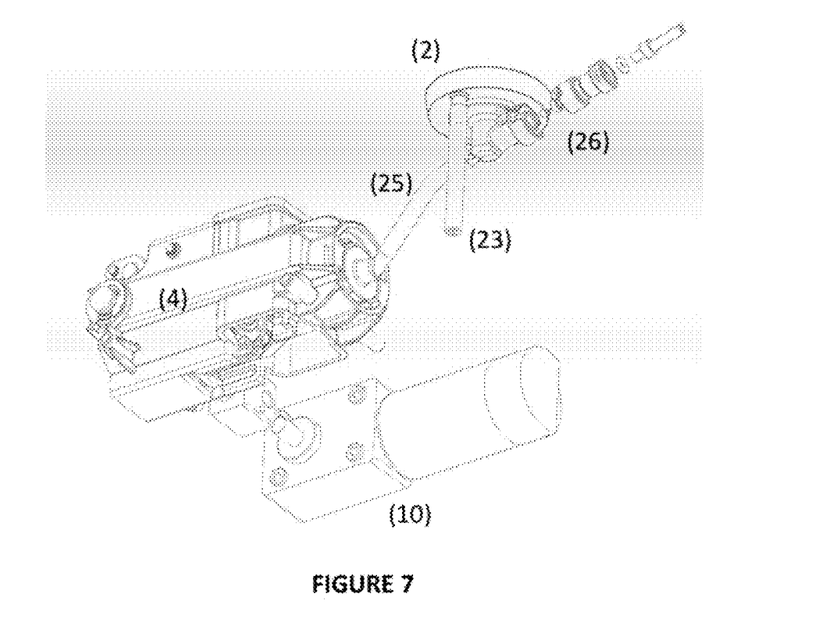
FIG. 7: perspective view from the bottom of part of the operative components of embodiment of a beverage apparatus (3) of a system according to the present invention.
Figure 8:
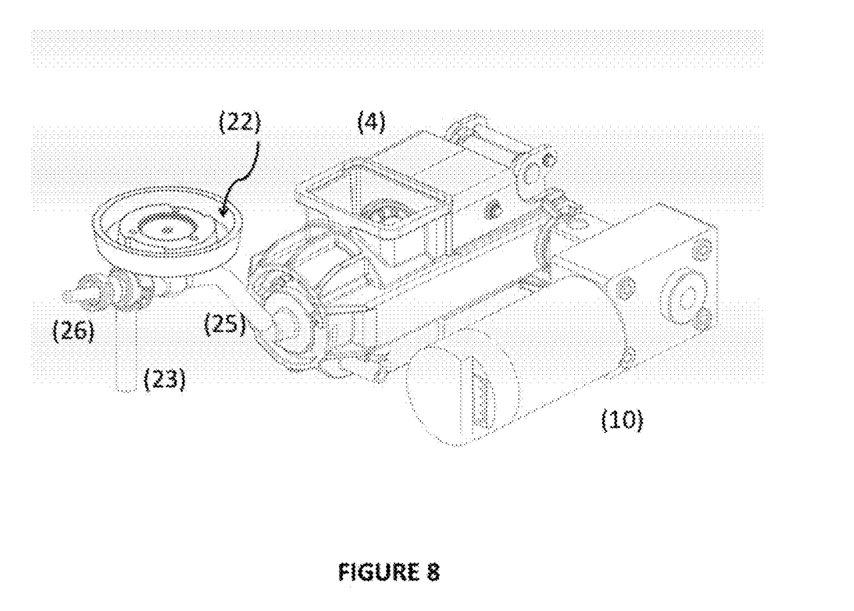
FIG. 8: perspective view from the top of part of the operative components of embodiment of a beverage apparatus (3) of a system according to the present invention.
Figure 9:
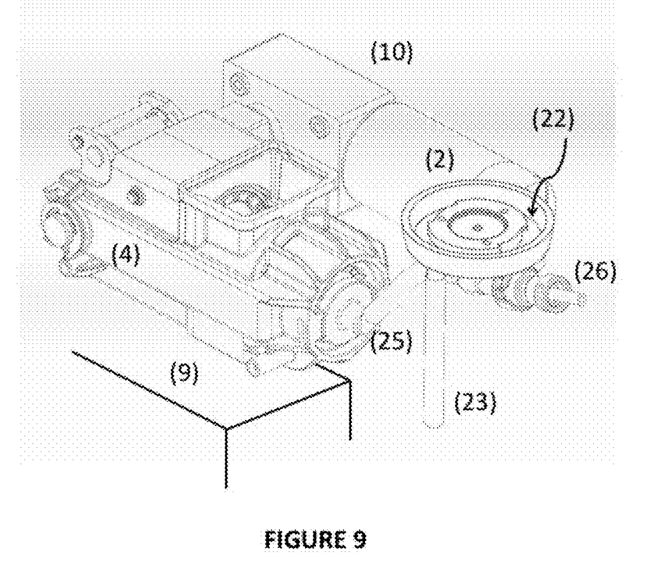
FIG. 9: perspective view from the top of part of the operative components of embodiment of a beverage apparatus (3) of a system according to the present invention.

FIGS. 7 to 9 represent different views of the preferred embodiment of relative disposition of purge means (26) in a beverage apparatus (3) of a system according to the present invention.

It is particularly preferred when said beverage discharge connection (25) develops generally upwards from an exit side of said beverage preparation device (4) and at least until the vicinity of said beverage discharge element (21), including along at least one of: along an at least approximately vertical direction, and along a direction of at least 35° and at most 90° above of a horizontal direction.

In the case of the represented embodiment, said beverage discharge connection (25) develops along an oblique direction upwards, in particular along an angle comprised between 40° and 50°, in relation to a horizontal plane.

It is further preferred when said second flow circulation line develops in a non-vertical direction, at least in a portion of said second flow line downstream of said single-way device (261), preferentially in an oblique direction so that the purge fluid is discharged downwards, to the edge of the beverage discharge connection (25).

It is further preferred when said first flow line develops downstream of a flow pressurization device (7) and until the beverage discharge element (21), and said second flow circulation line develops from said flow pressurization device (7), passing by said electro-valve type device (262) and until a flow connection with said first flow circulation line.

According to another embodiment, said apparatus (3) further includes a three-way flow connection (27) that provides flow connection between said first flow line, second flow line and beverage discharge element (21), whereby the portions of connection of said three-way flow connection (27) downstream of said single-way device (261) and downstream of said beverage discharge connection (25) develop along at least one of vertical and oblique direction, preferentially along an at least approximately common direction.

Moreover, it is preferred when said purge means (26) are further adapted so that the purge flow can be collected by residues collection means (9) configured in form of recipient and disposed preferentially at least partially underneath said brewing device (4).

Figure 10:
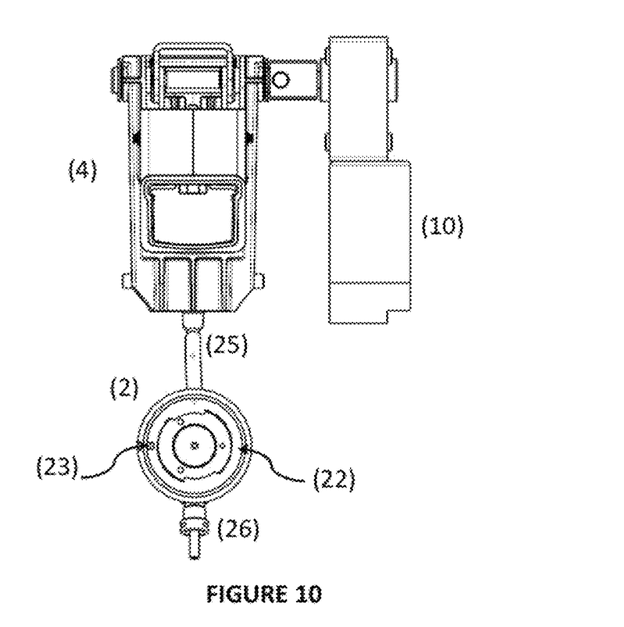
FIG. 10: top view of embodiment represented in FIG. 9, of a beverage apparatus (3) of a system according to the present invention.
Figure 11:
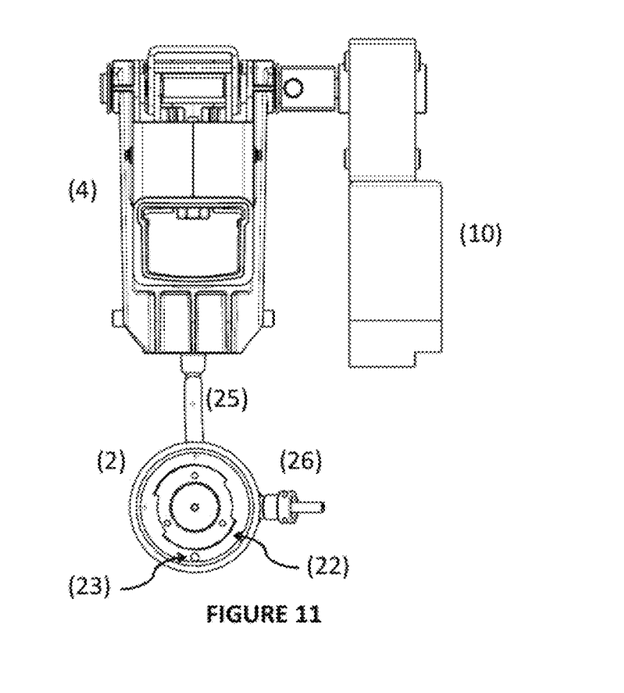
FIG. 11: top view of a second embodiment of a beverage apparatus (3) of a system according to the present invention.

FIGS. 10 and 11 show two top views of two alternative embodiments, in particular of the relative disposition of more elevated portion of second flow circulation line and associated purge means (26) in the proximity of the beverage discharge disposition (2).

The invention claimed is:

1. A system for preparing beverages, comprising:
a drinking recipient;
a beverage apparatus comprising a beverage preparation device configured to receive a single portion of edible substance and supply a beverage discharge flow though the single portion of edible substance and to a beverage discharge disposition;
said beverage preparation device comprising a first flow circulation line, downstream of a flow pressurization device and upstream of said beverage discharge disposition, and said beverage discharge disposition connected to the first flow circulation line by a beverage discharge connection,
said drinking recipient being adapted so that can be operatively placed on said beverage discharge disposition;
said beverage discharge disposition presenting a beverage discharge element configured to discharge a flow in a direction opposite that of the gravity force to an interior of said drinking recipient, and a recipient placement support surrounding said beverage discharge element;
wherein
said beverage apparatus further comprises purge means for providing circulation of a purge flow through said beverage discharge disposition, and in fluid connection, by a second flow circulation line, downstream from said flow pressurization device; and
wherein said second flow circulation line branches off of the first flow circulation line at a location downstream of the flow pressurization device.

2. The system according to claim 1, wherein
said purge means is provided upstream, along a purge flow direction of said beverage discharge connection, and said purge means provides circulation of a pressurized flow of a purge fluid through said second flow circulation line through said beverage discharge connection and said beverage preparation device along said first flow circulation line but in a flow direction opposite a beverage discharge direction.

3. The system according to claim 1, wherein
said purge means is in fluid connection with an edge of said beverage discharge connection, so as to circulate a pressurized flow of purge fluid through said flow pressurization device, and through the interior of said beverage preparation device and so that the purge fluid flows, assisted by the gravity force, through a discharge opening adapted for discharge of said single portion, inside of residue collection means provided underneath said beverage preparation device,
and
wherein said purge means is further adapted so that the purge flow is collected by residue collection means configured in a shape of a recipient disposed at least partially underneath said brewing device.

4. The system according to claim 1, wherein
said beverage apparatus comprises flow control means so that said first and second circulation flow lines can operate independently,
and
wherein said beverage apparatus further includes information display means to a user relating to operation of each one of said first and second circulation flow lines, whereby said information display means is associated with said beverage discharge disposition.

5. The system according to claim 1, wherein said purge means includes:
a single-way flow device or an electro-valve associated with said single-way flow device.

6. The system according to claim 5, wherein said single-way flow device is provided upstream of said beverage discharge element and said beverage discharge connection, and
when there is said electro-valve device said electro-valve device is provided upstream of said single-way flow device.

7. The system according to claim 5, wherein
said beverage discharge connection extends generally upwards from an exit side of said beverage preparation device and at least until a vicinity of said beverage discharge element, including along at least one of:
an at least approximately vertical direction; or
a direction of at least 35° and at most 90° above a horizontal direction,
and
said second circulation flow line extends in a non-vertical direction, at least in a portion of said second circulation flow line downstream of said single-way flow device and to an edge of beverage discharge connection.

8. The system according to claim 5, wherein
said first circulation flow line is downstream of the flow pressurization device and extends until the beverage discharge element, and, when there is said electro-valve device, said second circulation flow line is from said flow pressurization device, passing by said electro-valve device and until a flow connection with said first circulation flow line.

9. The system according to claim 5, wherein
said apparatus further includes a three-way flow connection that provides flow connection between said first circulation flow line, second circulation flow line and the beverage discharge element, whereby connection portions of said three-way flow connection and downstream of said single-way flow device and downstream of said beverage discharge connection extend along at least one of a vertical and oblique direction.

10. The system according to claim 1, wherein said beverage discharge disposition presents a recipient placement support including a base wall confined by an exterior confining wall and by an interior confining wall and extends around said beverage discharge element, whereby when the space between said exterior and interior confining walls presents a shape of ring type.

11. The system according to claim 1, comprising liquid residues discharge means associated with said recipient placement support, and configured to provide discharge of liquid only by action of the gravity force to residue collection means operatively associated in flow connection with said recipient placement support, whereby a base wall of the recipient placement support comprises at least one inclined region so as to guide liquid towards said liquid residues discharge means only by action of the gravity force.

12. The system according to claim 1, wherein said liquid residues discharge means includes a flow connection between at least one opening on a base wall of said recipient placement support and said residues collection means, whereby said flow connection is only moved by the action of the gravity force.

13. The system according to claim 1, wherein said apparatus comprises residues collection means configured as a recipient to collect the single portions discharged from said beverage preparation device by action of the gravity force, and removable so from inside of a chassis of said apparatus.

14. A process of preparing a beverage using the system according to claim 1, comprising the following steps:
providing the beverage apparatus;
placing the drinking recipient in operative engagement on said beverage discharge disposition;
automatically opening the brewing device actuated by a motorized device;
introducing a single portion in the brewing device;
automatically closing the brewing device actuated by the motorized device;
initiating a beverage preparation cycle, including beverage discharge to said drinking recipient;
removing said drinking recipient from operative engagement with said beverage discharge disposition;
confirming by automatic means that there is no single portion of edible substance inside of said brewing device;
initiating a purge cycle, including by means of an electrovalve device, and circulation of a purge flow through at least part of said beverage discharge disposition, including through the beverage discharge connection along a circulation direction contrary to that of the beverage discharge.

15. The process according to claim 14, further comprising at least one of the following steps:
providing the user with an indication relating to at least one of: the need for a purge cycle after a previously determined number of beverage preparation cycles, the need of a purge cycle according to automatically acquired data associated with at least one previously defined parameter relating to the beverage discharge flow; and
providing the user with an indication relating to at least one of: purge cycle initiating, in progress and concluded, whereby the indication is presented by information display means associated with said beverage discharge disposition.

16. The process according to claim 14, wherein the purge cycle is carried out according to at least one of:
without requiring any intervention by the user associated with the purge cycle; and
with intervention by the user.

17. The process according to claim 14, further comprising the following steps:
providing the user with an indication relating to a purge cycle still to be initiated;
placing the drinking recipient in operative engagement on the recipient placement support;
confirming the realization of the previous step;
initiating the purge cycle;
providing the user with an indication relating to the concluded purge cycle.

18. A system for preparing beverages, comprising:
a drinking recipient;
a beverage apparatus comprising a beverage preparation device configured to receive a capsule containing single portion of edible substance and supply a beverage discharge flow though the single portion of edible substance and to a beverage discharge disposition;
said beverage preparation device comprising a first flow circulation line, downstream of a flow pressurization device and upstream of said beverage discharge disposition, said beverage discharge disposition connected to the first flow circulation line by a beverage discharge connection;
said drinking recipient configured to be operatively placed on said beverage discharge disposition;
said beverage discharge disposition presenting a beverage discharge element configured to discharge a flow in a direction opposite that of the gravity force to an interior of said drinking recipient, and a recipient placement support surrounding said beverage discharge element;
wherein said beverage apparatus further comprises a second flow circulation line that is arranged to circulate purge fluid through said beverage discharge disposition, the a second flow circulation line disposed downstream from said flow pressurization device; and
wherein said second flow circulation line branches off of the first flow circulation line at a location downstream of the flow pressurization device.

19. The system according to claim 1, wherein the edible substance is coffee and the flow pressurization device is a pump that supplies fluid flow at a pressure between 10 and 20 bars.

20. The system according to claim 1, wherein the flow pressurization device supplies fluid flow to both the first flow circulation line and the second flow circulation line.

* * * * *